(12) United States Patent
Yu (10) Patent No.: US 9,516,038 B2
(45) Date of Patent: Dec. 6, 2016

(54) IDENTIFICATION OF UNAUTHORIZED DISCLOSURE

(71) Applicant: Bank of America Corporation, Charlotte, NC (US)

(72) Inventor: Sounil Yu, Reston, VA (US)

(73) Assignee: Bank of America Corporation, Charlotte, NC (US)

( * ) Notice: Subject to any disclaimer, the term of this patent is extended or adjusted under 35 U.S.C. 154(b) by 230 days.

(21) Appl. No.: 14/084,672

(22) Filed: Nov. 20, 2013

(65) Prior Publication Data

US 2015/0143537 A1    May 21, 2015

(51) Int. Cl.
*H04L 29/06* (2006.01)
*G06F 21/16* (2013.01)

(52) U.S. Cl.
CPC ............. *H04L 63/126* (2013.01); *G06F 21/16* (2013.01); *H04L 63/1441* (2013.01)

(58) Field of Classification Search
CPC ............... H04L 63/126; H04L 2209/60; H04L 2209/606–2209/608; G06F 17/30011–17/30014; G06F 21/16
See application file for complete search history.

(56) References Cited

U.S. PATENT DOCUMENTS

| | | | |
|---|---|---|---|
| 2009/0187629 A1* | 7/2009 | Chakra et al. | 709/206 |
| 2010/0296655 A1* | 11/2010 | Solow et al. | 380/279 |
| 2014/0137238 A1* | 5/2014 | Brdiczka | G06F 21/556 |
| | | | 726/22 |

* cited by examiner

*Primary Examiner* — Linglan Edwards
*Assistant Examiner* — Kevin Bechtel
(74) *Attorney, Agent, or Firm* — Banner & Witcoff, Ltd.; Michael A. Springs (57) ABSTRACT

Systems, methods, computer-readable media, and apparatuses for identifying a source of an unauthorized disclosure of information are provided. For instance, a document may be generated and transmitted to a plurality of users. The document transmitted may be the same document (e.g., no additional documents are created for different users). Upon accessing the document, users in different groups of users may view different data items in a data item field in the document. If a disclosure is made, the data item disclosed may aid in identifying the group of users who viewed that data item and may be the source of the disclosure. That identified group may then be further sorted or divided into two or more subgroups and another document may be transmitted to the plurality of users. The process may continue in this manner until a source of the disclosure is identified.

20 Claims, 8 Drawing Sheets

IDENTIFICATION OF UNAUTHORIZED DISCLOSURE

BACKGROUND

Maintaining information as confidential is a challenge in today's workplace. With the increasing availability of information and data through various devices (e.g., computer terminals, smartphones, and the like), ensuring confidential information remains confidential is an important aspect of doing business. However, if information is disclosed without authorization, it is important to be able to identify a source of the disclosure. If the disclosure is made via electronic means (e.g., email, SMS, and the like), tracking of the information and disclosure may be straightforward. However, if the disclosure is made via other means (e.g., disclosure in a meeting, via a telephone conversation, and the like), tracking of the information and disclosure may be more complicated.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, systems and apparatuses for identifying a source of an unauthorized disclosure of information. For instance, a document may be generated and transmitted to a plurality of users. The document transmitted may be the same document (e.g., no additional documents are created for different users). Upon accessing the document, users in different groups of users may view different data items in a data item field in the document. If a disclosure is made, the data item disclosed may aid in identifying the group of users who viewed that data item and may be the source of the disclosure. That identified group may then be further sorted or divided into two or more subgroups and another document may be transmitted to the plurality of users. The process may continue in this manner until a source of the disclosure is identified.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

It is noted that various connections between elements are discussed in the following description. It is noted that these connections are general and, unless specified otherwise, may be direct or indirect, wired or wireless, and that the specification is not intended to be limiting in this respect.

One or more systems, methods, computer-readable media and/or apparatuses described herein relate to identifying a source of an unauthorized disclosure of information. For instance, in situations in which a disclosure is made through, for example, verbal means (e.g., telephone conversation, in person conversation, and the like) tracking of the source of the disclosure may be difficult. Accordingly, information may be communicated to a plurality of users with slight variations in one or more pieces of information or data items. For instance, a document may include a value, chart or graph. A portion of the value, chart or graph, may be altered for different users, groups of users, and the like, in order to store or maintain a list of which users received which pieces of information. If a disclosure should occur, the piece of information disclosed may then identify a user, group of users, and the like that may have been the source of the information.

In the examples discussed herein, a document may be generated and transmitted to a plurality of users. The document transmitted to each user may be the same. However, one or more data items may be displayed differently or as different values when a user or user of a group of users accesses the document. These and various other aspects will be discussed more fully below.

Figure 1:
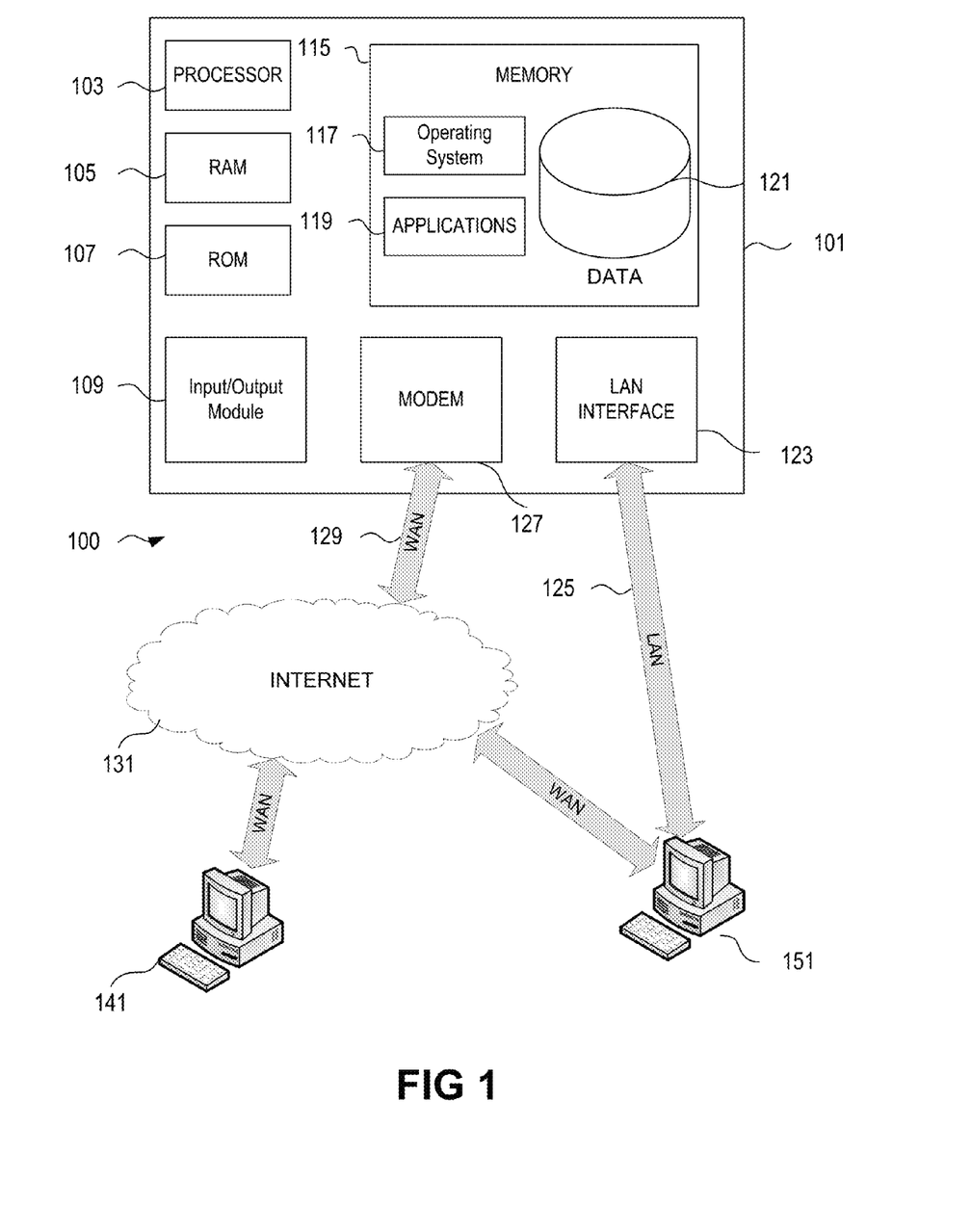
FIG. 1 illustrates an example operating environment in which various aspects of the disclosure may be implemented.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed arrangements is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141 and 151. Computing devices 141 and 151 may be personal computing devices or servers that include any or all of the elements described above relative to computing device 101. Computing devices 141 or 151 may be a mobile device (e.g., smart phone) communicating over a wireless carrier channel.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
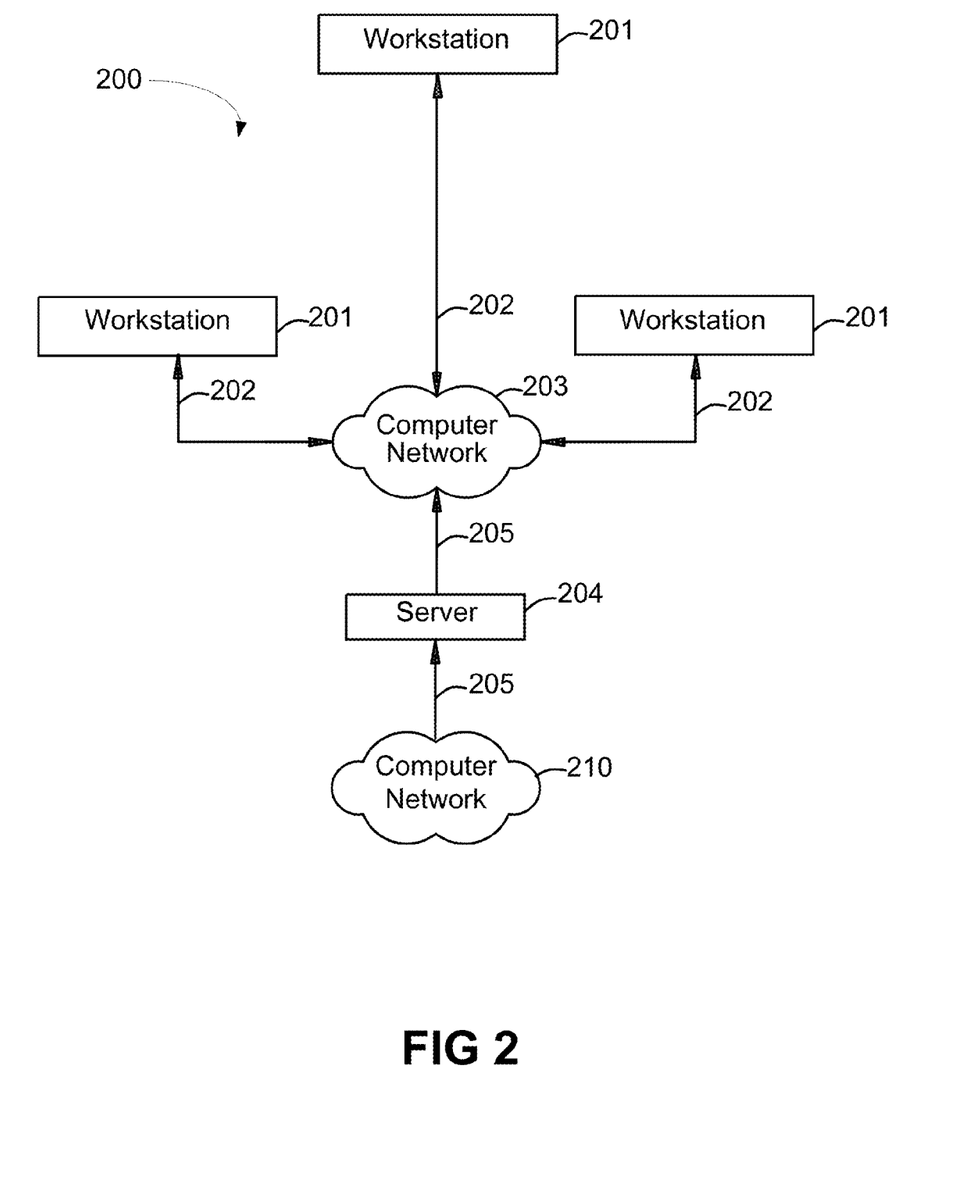
FIG. 2 is an illustrative block diagram of workstations and servers that may be used to implement the processes and functions of certain aspects of the present disclosure according to one or more aspects described herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204 (e.g. network control center), such as network links, dial-up links, wireless links, hard-wired links, as well as network types developed in the future, and the like. A virtual machine may be a software implementation of a computer that executes computer programs as if it were a standalone physical machine.

Figure 3:
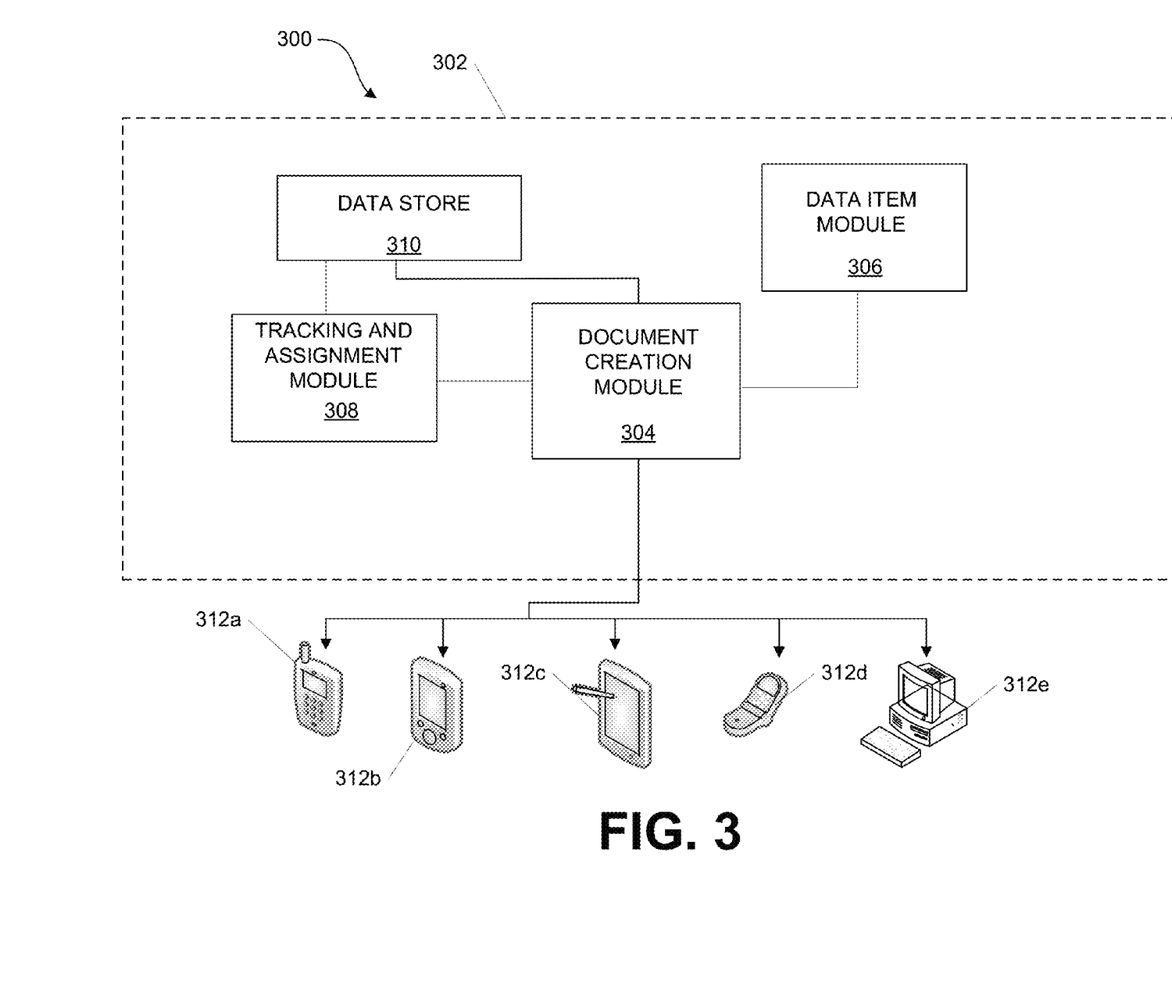
FIG. 3 illustrates an example unauthorized disclosure identification system according to one or more aspects described herein.

FIG. 3 illustrates one example unauthorized disclosure identification system 300 according to one or more aspects described herein. The system 300 may include some or all of the components discussed above with respect to the computing device of FIG. 1 and may be embodied in one or more computing devices, servers, software, and the like. In some examples, the unauthorized disclosure identification system 300 may be part of, internal to or associated with an entity 302. The entity 302 may be a corporation, university, government entity, and the like. In some examples, the entity 302 may be a financial institution, such as a bank. Although various aspects of the disclosure may be described in the context of a financial institution, nothing in the disclosure shall be construed as limiting the unauthorized disclosure identification system 300 and methods described herein to use within a financial institution. Rather, the system may be implemented by various other types of entities.

The unauthorized disclosure identification system 300 may include one or more modules that may include hardware and/or software configured to perform various functions within the system 300. For instance, the system 300 may include a document creation module 304. The document creation module 304 may include hardware, software, and/or a combination thereof configured for creation of one or more documents, such as via known software programs for the creation of documents (e.g., spreadsheet creation software, word processing software, and the like). The documents created may be standard documents and may be created using the module and/or may be uploaded to the module 304 or system 300 as desired. The document may be created using one or more computing device, such as computing devices 312a-312e. For instance, the document may be created using a smartphone 312a, personal digital assistant (PDA) 312b, tablet computer 312c, cell phone 312d, or other computing device 312e.

In some arrangements, the documents created may include a data item field. The data item field may be configured to display a data item, such as a data item generated by data item module 306. The data item module may identify or determine a particular data item to display in a data item field in a document based on a user accessing the document. For instance, a created document (e.g., a document created via document creation module 304) may include various pieces of information. In some examples, one piece of information or data may be located in a data item field. This piece of information or data (e.g., a data item) may vary based on a user or type of user accessing the document. Accordingly, although the same document may be transmitted to every user on a distribution list, upon accessing the document, some users may have a first data item displayed in the data item field, while other users may have a second different data item displayed in the data item field. Thus, if one of the first or second data items is disclosed (e.g., leaked to the media, and the like), the system may identify one or more users who had the disclosed data item displayed in the document and may then narrow down the source of the disclosure based on which users received the disclosed data item. The document may be transmitted to a computing device of a user (e.g., one or more of computing devices 312a-312e). The user computing device may then be used to access the document and view the document with the data item associated with that user.

In some arrangements, the data item field may be identified by an administrator or other person or entity implementing the system. In other examples, the data item field may be determined by the system 300. In some examples, the data item may be determined or identified by a creator of the document (e.g., the piece of data in the data item field may be determined by the individual creating the document). Further, other data items (e.g., a second data item, third data item, and the like) that may be displayed to various users or user groups may, in some examples, be determined by the system 300. For example, the system may generate alternate data items to appear in the data item field for various users or groups of users.

The data item module 306 may assign the data items to various users or groups of users. In some examples, users on a distribution list associated with a document (e.g., a distribution list of users to which the document is being sent) may view one of two data items when accessing the document. The data item module 306 may select the data item to display to each user based on a variety of factors. In some examples, the data item displayed may be randomly selected (e.g., every other user may be view the first data item while the remaining alternating users may view the second data item). In another example, the first half of the users to access the document may view the first data item, while the second half of users to access the document may view the second data item. In other examples, the data item viewed by one or more particular users may be based on historical information collected from distribution of previous documents, as will be discussed more fully below.

The data item itself may be any type of data. For instance, the data item may be a chart or graph or portion thereof. In other examples, the data item may be a numerical value. The difference between the first and second data items may be a subtle difference. For instance, it may be just slightly different such that users aware of the difference between the data items may attribute the difference to a typographical error or other mistake. For example, the data item may be a chart, such as a pie chart, and the first data item may indicate that the largest portion of the chart is 51.322% while the second data item may identify the largest portion of the chart as 51.323%. This discrepancy is slight and could thus be attributed to error. However, the difference in the first and second data items may be deliberate in order to identify a source of any unauthorized disclosure of the information contained in the document.

In another example, the document displaying a first data item may indicate that 23,912 individuals may be affected by a coming action, while a document displaying the second data item may indicate that 23,921 individuals may be affected by the coming action. This difference could easily be attributed to error (e.g., the 1 and 2 being transposed inadvertently) but may instead be displayed deliberately in order to better identify a source of any disclosure of the information.

Accordingly, the examples above and arrangements described herein, the data items may be unique to a user, groups or users, subgroup of users, and the like.

The data items displayed and associated users viewing each data item may be stored, for instance, in data store 310. This information may be used to track and identify a source of any disclosure of information and/or may be used to determine a data item to be viewed by users in future distribution of documents.

The unauthorized disclosure identification system 300 may further include tracking and assignment module 308. The tracking and assignment module 308 may monitor one or more communications or types of communications for disclosure of information (e.g., a data item). For instance, the tracking and assignment module 308 may track one or more news feeds, media reports, and the like, to determine whether a data item has been disclosed (e.g., after the document has been transmitted to the distribution list of users). In some examples, tracking or monitoring of entities, reports, etc. that may include information disclosed may also be performed by one or more users of the system monitoring one or more media outlets for information disclosed without authorization.

Accordingly, upon a determination being made that one or more data items have been disclosed (e.g., without authorization), the tracking and assignment module 308 may determine (e.g., based at least in part on data from data store 310) which users or group of users viewed the data item disclosed. Accordingly, the group of users who viewed the disclosed data item may then be sorted into two subgroups (e.g., approximately half of the users in the group that viewed the disclosed data item may be in a first subgroup while approximately half may be in a second subgroup). Accordingly, when a document is distributed in the future, the first subgroup may view a first data item while the second subgroup may view a second data item. Accordingly, a similar process to that described above may be used to further narrow a source of any disclosure of either the first or second data item.

In some examples, the identities of users in a group viewing a disclosed data item may be stored, such as in data store 310. This information may be used to track the unauthorized disclosure of data and/or to further aid in identifying a source (e.g., a user) disclosing information without authorization.

Figure 4:
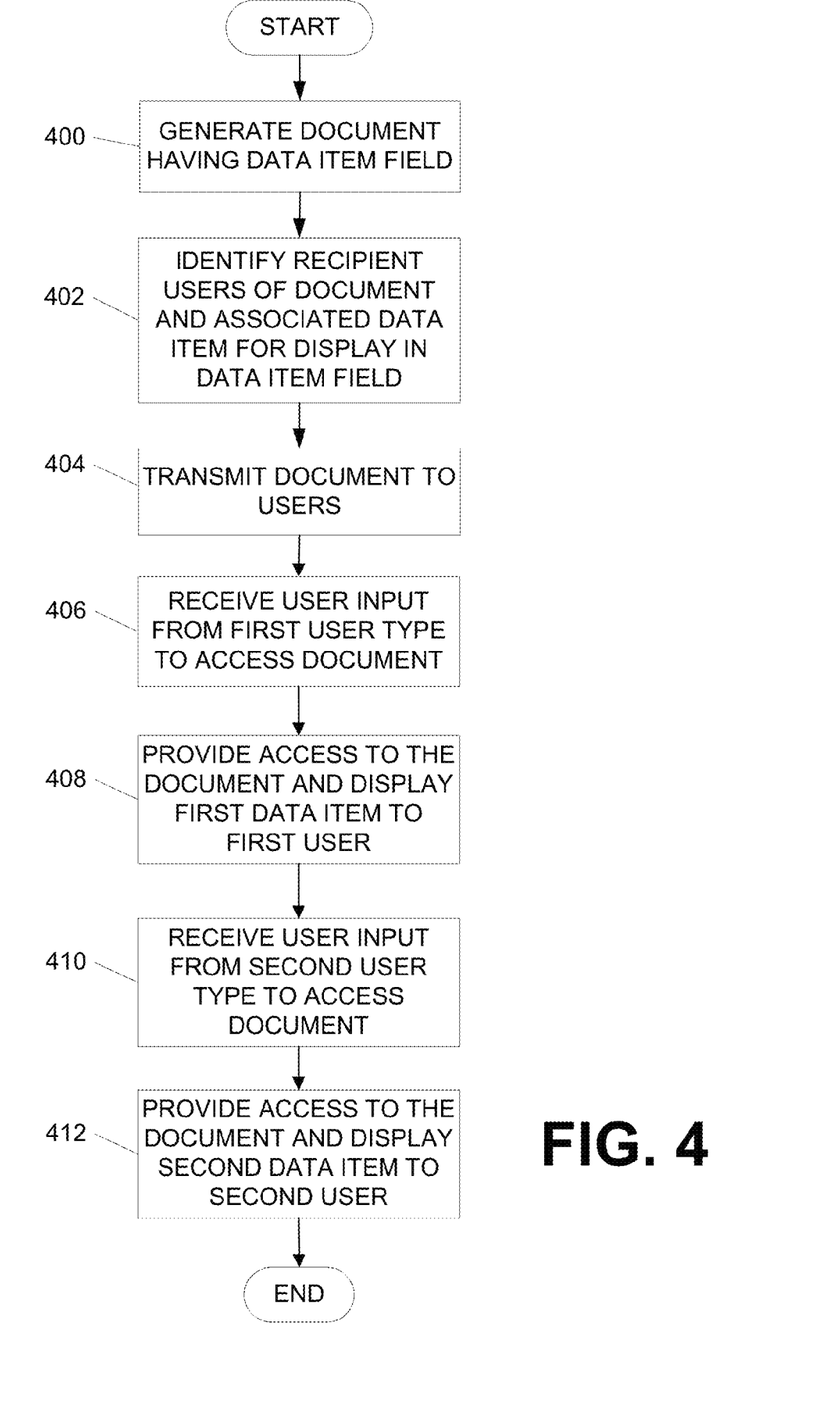
FIG. 4 is an example method of identifying a source of an unauthorized disclosure according to one or more aspects described herein.

FIG. 4 illustrates one example method of identifying a source of an unauthorized disclosure according to one or more aspects described herein. In step 400, a document may be generated. As discussed above, the document may be one of various types of documents generated via a word processing software program, spreadsheet program, and the like. In step 402, a distribution list or list of recipients to whom the document will be transmitted may be identified. Identification of the recipient users may further include identifying a data item to be displayed to each user upon accessing the document. For instance, as discussed above, some users, upon accessing the document, may view a first data item in a data item field of the document, while other users may view a second data item different from the first data item in the data item field of the document.

In step 404, the generated document may be transmitted to users on the identified distribution list. In some examples, the document transmitted to the users may be the same, substantially the same or substantially identical. However, upon accessing the document, the users may view different data items in the data item fields of the document. This may reduce or eliminate the need to generate a different document for each user (e.g., similar to a watermarking process) to identify a source of a disclosure. That is, the same document (e.g., a single document) may be generated and transmitted to the users. However, upon accessing it, the documents may include different data items to aid in identifying a source of any unauthorized disclosure of the information contained in the document.

In step 406, user input may be received from a first user to access the document. The user input may include attempting to access or open the document (e.g., by selecting the document from an email, and the like). The first user may be a first type of user or member of a first group of users. For example, in determining the data item to display, the users on the distribution list may be sorted into multiple groups, each group viewing a different data item upon accessing the document. Accordingly, if two groups are identified, each member of each group may view the same data item. However, members of the first group may view a different data item than members of the second group. As discussed above, the data item may be assigned to a user randomly (e.g., alternating users receive different data items, and the like). In step 408, access to the document may be provided and a first data item may be displayed in the data item field of the document.

In step 410, user input from a second user may be received to access the document. Similar to the arrangement above, the user input may include an attempt to open or access the document. The second user may be different from the first user and may be a second type of user (e.g., the system may have randomly sorted the distribution list into two groups or types of users). Accordingly, in step 412, access to the document may be provided and the second data item may be displayed to the second user in the data item field of the document.

Figure 5:
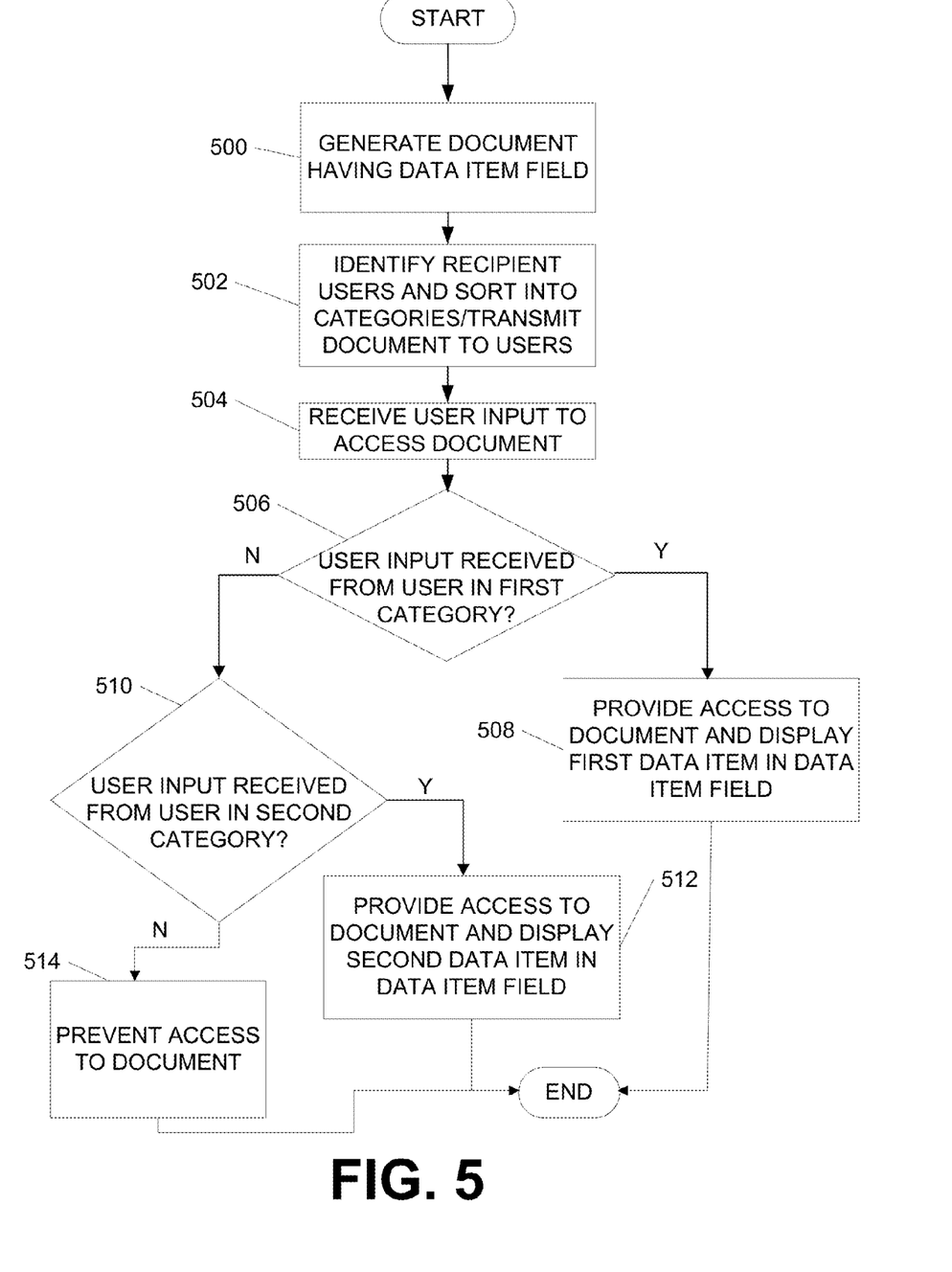
FIG. 5 is another example method of identifying a source of an unauthorized disclosure according to one or more aspects described herein.

FIG. 5 illustrates another example method of identifying a source of an unauthorized disclosure according to one or more aspects described herein. In step 500, a document having a data item field is generated. The document may be generated using systems, software and/or methods similar to those described above. In step 502, a distribution list of recipient users may be identified. The users may, in some examples, be sorted into categories or groups. For instance, the user may be sorted into two groups or categories with each group or category viewing a different data item upon accessing the document. For example, a first group or category will view a first data item, while a second group or category will view a second data item. The groupings may be random or may be based on historical information (e.g., users who have been in a previous group that was associated with a disclosure, and the like). The generated document may then be transmitted to the users.

In step 504, user input may be received to access the document. The user input may be received from a user on the distribution list who received the transmitted document and may include an attempt to open or access the document. In step 506, a determination is made as to whether the user input was received from a user in a first category. If the user input was received from a user in the first category, access to the document may be provided in step 508. The document accessed by the first user may include a first data item displayed in the data item field of the document.

If, in step 506, it is determined that the request to access the document was not received from a user in the first category, a determination may be made in step 510 as to whether the request to access the document was received from a user in a second category. If so, access to the document will be provided in step 512 and the document may include a second data item, different from the first data item, displayed in the data item field. In some examples, the determination of the particular data item viewed by the user (e.g., the first or second user) may be automatically generated upon opening the document. For instance, the data item displayed might not be predetermined based on the particular user, but rather may be randomly assigned (e.g., alternating users opening the document see alternating data items, and the like). If, in step 510, the user requesting access is not part of the second category of users, access to the document may be denied and/or the process may end.

Figure 6A:
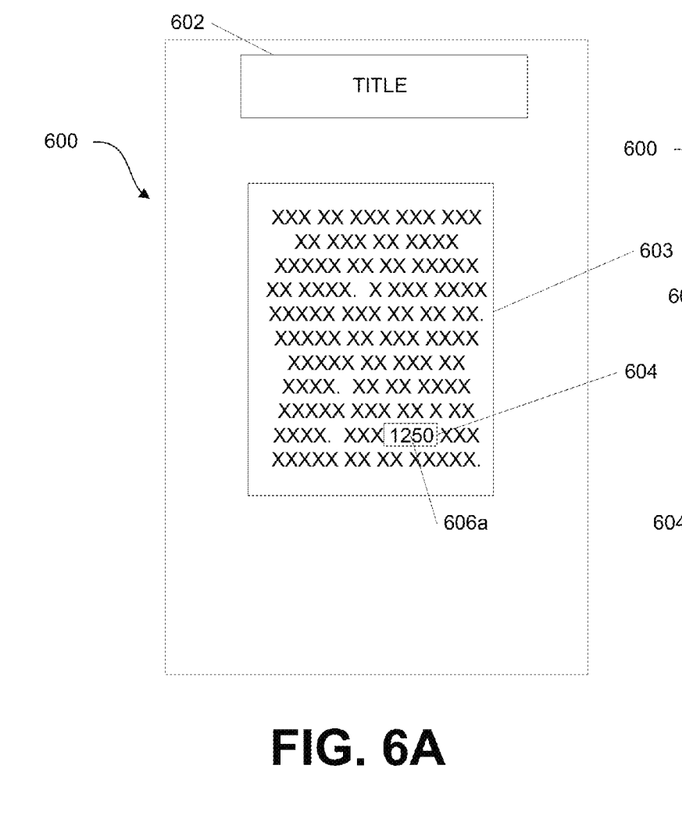
FIGS. 6A and 6B illustrate an example document that may be transmitted to a plurality of users to identify a source of an unauthorized disclosure according to one or more aspects described herein.
Figure 6B:
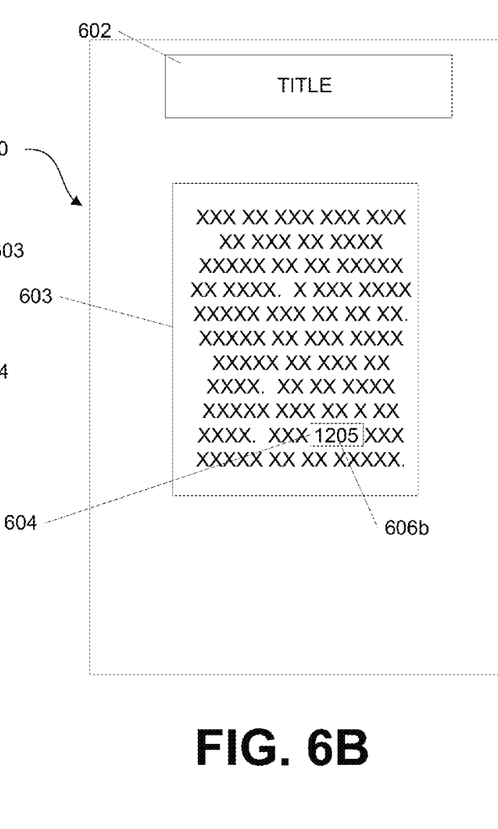

FIGS. 6A and 6B illustrate an example document that may be used in accordance with the systems and methods described herein. The document 600 shown in FIG. 6A may be provided to a user in, for example, a first category as described in FIG. 5, while the document 600 may be provided to, for example, a user in the second category described in FIG. 5. The document 600 is transmitted to all users of all categories and is a single document. That is, one document is generated and sent to all users on the distribution list. Transmission of the document does not include creation of two or more different documents having different data to be viewed by different users. Rather, one document 600 is generated and transmitted to all users.

The document 600 may include a title region 602 and a text region 603. The document 600 may further include a data item field 604. The data item field 604 may display different data items depending upon the user or type of user accessing the document. For instance, if the user is a user from, for example, the first category in FIG. 5, the user may view a first data item 606a. If the user is from a second category, as discussed in FIG. 5, the user may view a second data item 606b different from the first data item 606a.

As discussed above, the data items may be different but, in some examples, the difference may be slight or subtle. That is, the difference may be sufficiently small that, should users from different groups or receiving different data items notice a difference, they would presume that the difference was the result of an error of some sort. However, upon determining that a disclosure of a data item has been made, the data item disclosed (e.g., the first data item or the second data item) would identify the group or category of the user who made the disclosure. This may aid in identifying, from the distribution list of users to whom the document was transmitted, who disclosed the information.

Figure 7A:
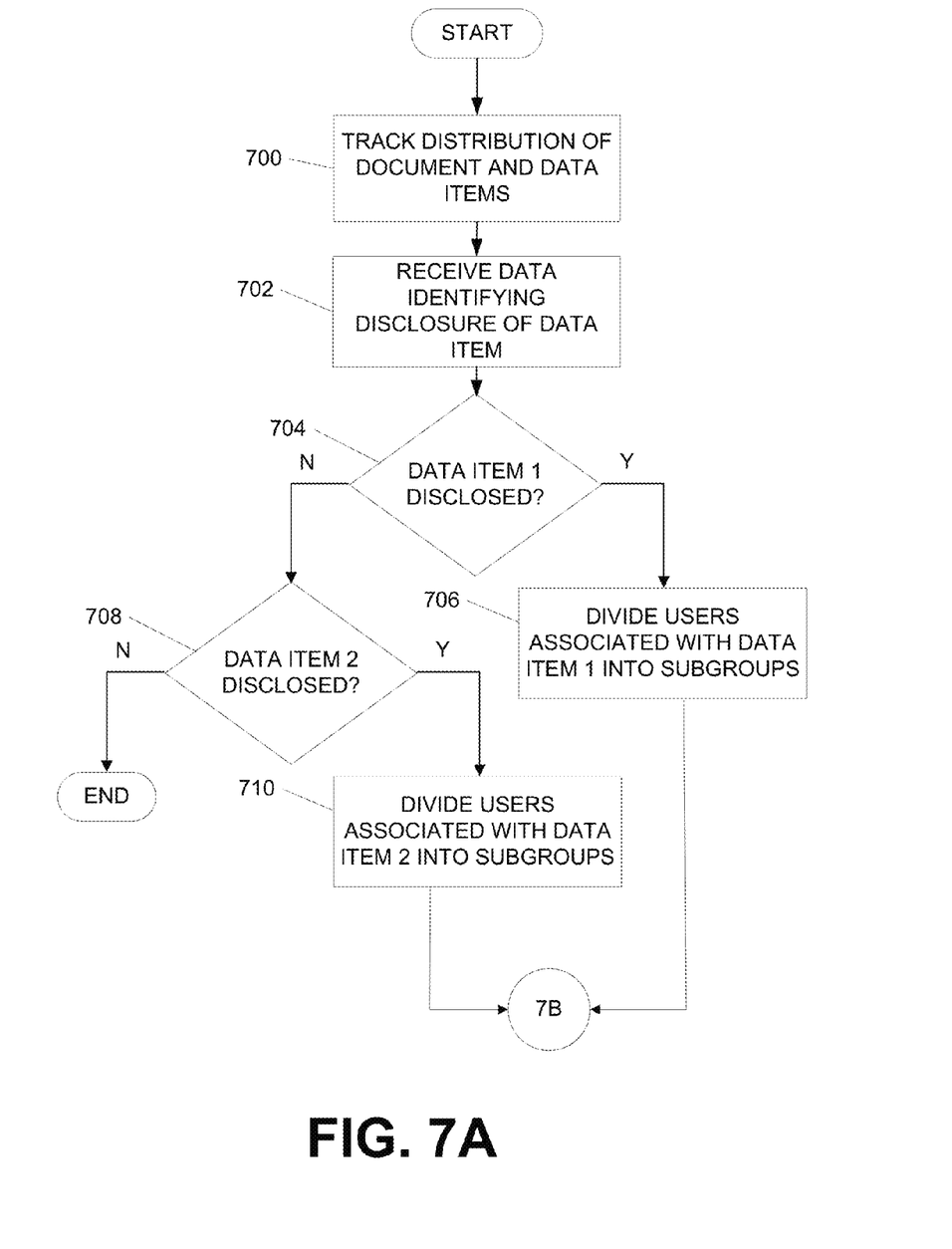
FIGS. 7A and 7B illustrate yet another example method of identifying a source of an unauthorized disclosure according to one or more aspects described herein.
Figure 7B:
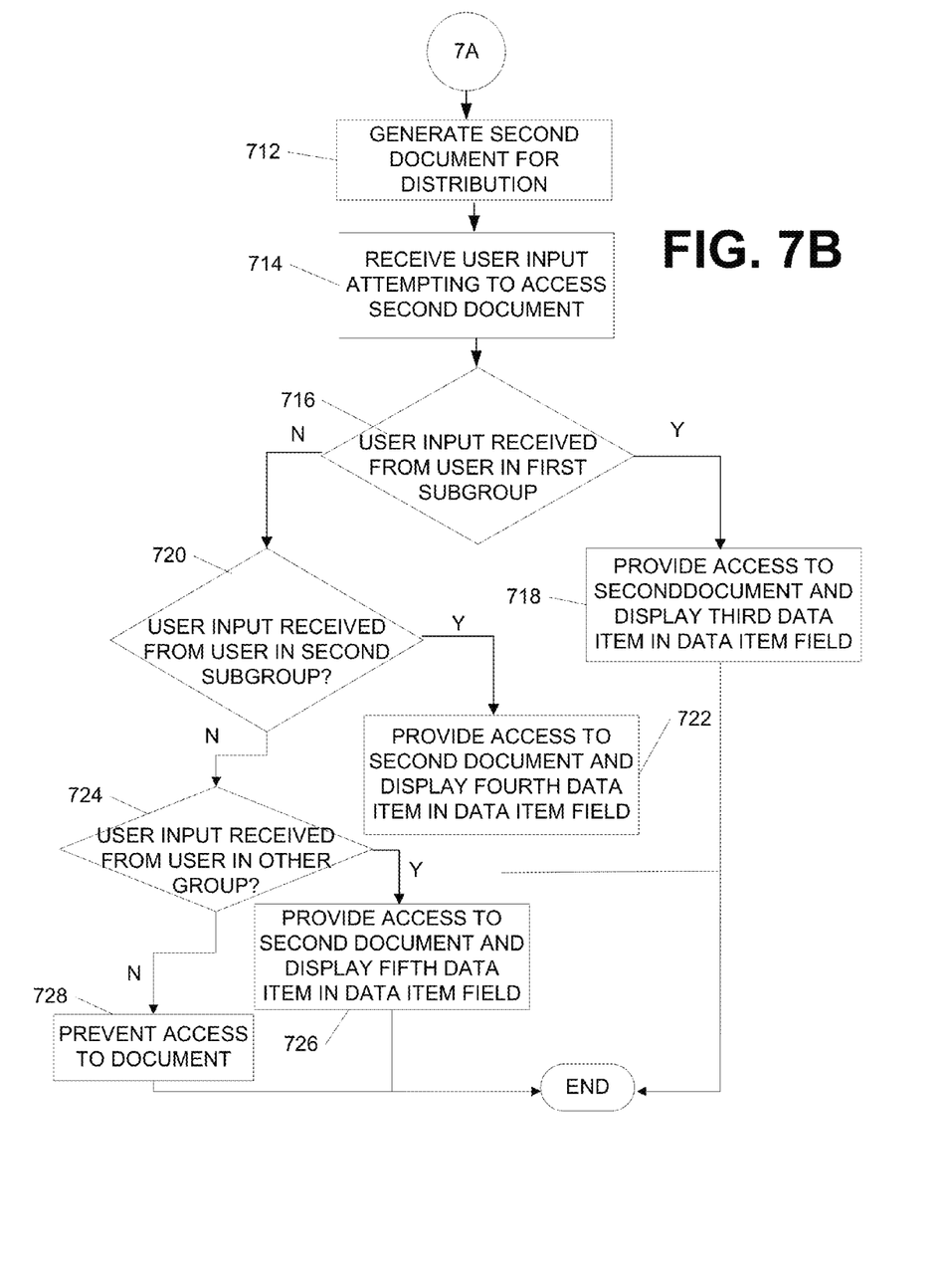

For example, FIGS. 7A and 7B illustrate yet another method of identifying a source of an unauthorized disclosure according to one or more aspects described herein. In step 700, distribution of a document and associated data items may be tracked. For instance, a document may be generated and distributed according to methods described above. The distribution of the document, as well as users viewing different data items may be stored. In the example described herein, two different data items may be identified. In step 702, information associated with an unauthorized disclosure is received. For instance, the information may be determined automatically from monitoring portion of the system that monitors one or more media outlets, the Internet, and the like, to scan for disclosure of a data item. Additionally or alternatively, a user or administrator of the system may learn of a disclosure of a data item.

In step 704, a determination is made as to whether the disclosed data item is a first data item (e.g., data item 1). If so, the users associated with data item 1 (e.g. the group of users that viewed data item 1 in the data item field upon accessing the document) may be divided into subgroups in step 706. For instance, the users may be divided into two or more subgroups for further analysis, processing, and the like.

If, in step 704, the disclosed data item is not the first data item, a determination may be made in step 708 as to whether the disclosed data item is a second data item (e.g., data item 2). If so, the users associated with the second data item (e.g., the group of users that viewed data item 2 in the data item field upon accessing the document) may be divided into subgroups in step 710.

From steps 708 and 710 (e.g., once a group of users has been divided into subgroups), the process continues in FIG. 7B with step 712 in which a second document is generated. The second document may be generated in a manner similar to the first document, as discussed above. The second document may be transmitted to the same distribution list to whom the first document was transmitted (e.g., the document being tracked in step 700) and, similar to the arrangements discussed above, the data item displayed in a data item field in the second document may vary based on the group or subgroup associated with the user accessing the document.

In step 714, user input is received to access the second document. User input may include an attempt to open or access the document. In step 716, a determination is made as to whether the user input is received from a user in a first subgroup (e.g., subgroup from either step 706 or 710). If so, access is provided to the document and a third data item is displayed in the data item field of the second document in step 718. If not, a determination is made in step 720 as to whether the user input is received from a user in the second subgroup. If so, access to the document is provided and a fourth data item may be displayed in the data item field of the document in step 722.

If, in step 720, it is determined that the user input is not received from a user in the second subgroup, then in step 724, a determination is made as to whether the user input is received from another group (e.g., the group of users that was not divided into subgroups). If so, access to the document may be provided and a fifth data item may be displayed in the data item field of the second document in step 726. If not, access to the document may be prevented in step 728.

The following provides one example of the systems, methods, apparatuses, and the like described herein. However, it is merely one example arrangement and nothing in the example should be viewed as limiting. Various other examples may be used, implemented, and the like, without departing from the invention.

In one example, a first document may be generated identifying, among other things, a bar graph illustrating profits over the past 12 months. The first document may include a data item field that includes the amount of profit made in the month of July. The first document may be transmitted to 100 users, such as via email. The first 50 users to access the first document may view a first data item in the data item field that indicates that profits were $2.1 million, while the second 50 users to access the first document may view a second data item in the data item field that indicates the profits were $2.2 million. The difference between the two data items may be subtle enough that it may appear to be an error, however, the different data items have been generated and provided to the users deliberately to identify a source of any disclosure of the information contained within the first document. The system may track and store (e.g., by IP address, username, unique identifier, and the like) which user viewed which data item.

Once the first document has been transmitted to the users, the system may monitor various reports, news feeds, and the like to determine whether an unauthorized disclosure has taken place. If a disclosure has taken place, the group associated with the data item that was disclosed may be identified and further divided into subgroups. For instance, if the amount disclosed was "$2.1 million," then a determination may be made that the information was provided by a source who is a user in the first group of users (e.g., the first 50 users to access the document). The identity of those users may be retrieved and those 50 users may be divided into subgroups. For example, the 50 users may be divided into two subgroups of 25 users each. A second document may be generated and distributed as discussed above. The second document may include text indicating a purchase of another company and the amount of the purchase. The amount of the purchase may be the data item field.

The second document may be transmitted to the 100 users on the distribution list. However, users in a first subgroup may view a data item different from users in the second subgroup. Further, both subgroups may view a data item different from the second user group identified from distribution of the first document (e.g., the second 50 people to access the first document). For example, the first subgroup (25 users) may view a data item identifying the purchase price as $8.3 million, while the second subgroup (25 users) may view the data item identifying the purchase price as $8.5 million. The second user group (e.g., 50 users) may view a data item identifying the purchase price as $8.2 million. Accordingly, the system may again monitor various channels to determine if a disclosure has taken place. If so, the amount disclosed (e.g., to the media, and the like) may identify the source of the disclosure. For instance, if the disclosure reports the purchase price as "$8.5 million," the source of the disclosure is likely in the second subgroup. Accordingly, that group may be divided again and the process may continue until the source of the disclosure is determined.

As discussed above, the unauthorized disclosure identification systems and methods described herein may aid in identifying a source of a disclosure. The systems and methods described herein permit for creation of a single document that may be transmitted to a plurality of users, thereby eliminating a need to create multiple different documents for different users or user groups or manually altering the data in a document. The document may automatically display a different data item for different users or groups of users upon a user accessing the document, thereby making the system more efficient and less prone to errors.

Further, because the need to create multiple different documents is reduced or eliminated, the same document or any subsequent documents may be transmitted to the same distribution list of users in each iteration, thereby reducing the likelihood of raising suspicion on the part of the disclosure. For instance, in conventional systems, subsequent documents sent out may only be sent to a group of users having access to the disclosed information. Accordingly, as a user sees a distribution list of recipients being reduced, he or she might become suspicious that they have been identified as the source of the unauthorized disclosure. However, in the systems and methods described herein, the same distribution list may be used because only a single document is created with each iteration.

Further, although various examples throughout the disclosure describe the user of two data items or two groups or subgroups, other numbers of data items, groups, subgroups, and the like may be used without departing from the invention. For instance, a plurality of users may be sorted into four groups with each group viewing a different data item.

It should be noted that one or more aspects of the present disclosure may be performed automatically. For instance, a distribution list may be automatically generated and the document may be automatically transmitted to the distribution list, the alternate data items may be automatically generated, grouping of users may be performed automatically, and the like.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:

1. An apparatus, comprising:
   at least one processor; and
   a non-transitory memory storing computer-readable instructions that, when executed by the at least one processor, cause the apparatus to:
      transmit to a group of users, a first document including a data item field, the group of users including a first portion of the group including a first plurality of users and a second portion of the group including a second plurality of users different from the first plurality of users;
      receive, from a first user of the group of users, first user input accessing the first document;
      provide to the first user of the group of users, access to the first document and the data item field, the data item field including a first data item, wherein the first data item is a first numerical item that is visible in the first document;
      receive, from a second user of the group of users, second user input accessing the first document;
      provide to the second user of the group of users, access to the first document and the data item field, the data item field including a second data item different from the first data item, wherein the second data item is a numerical item that is visible in the first document,
      wherein alternating users accessing the first document and the data item field access data items in the data item field alternating between the first data item and the second data item, and
      wherein users accessing the first document with the first data item in the data item field form the first plurality of users forming the first portion of the group of users and users accessing the first document with the second data item in the data item field form the second plurality of users forming the second portion of the group of users;
      receive data identifying a disclosure, the disclosure including one of the first data item and the second data item;
      responsive to receiving data identifying disclosure of the first data item, identifying users of the first plurality of users as a potential source of the disclosure; and responsive to receiving data identifying disclosure of the second data item, identifying the users of the second plurality of users as a potential source of the disclosure.

2. The apparatus of claim 1, wherein the first portion and the second portion are an entirety of the group of users.

3. The apparatus of claim 1, further including instructions that, when executed, cause the apparatus to:
after receiving the data identifying the disclosure and responsive to receiving data identifying disclosure of the first data item, sort the first plurality of users into at least two subgroups; and
after receiving the data identifying the disclosure and responsive to receiving data identifying disclosure of the second data item, sort the second plurality of users into at least two subgroups.

4. The apparatus of claim 3, further including instructions that, when executed, cause the apparatus to:
transmit a second document having a second data item field to the group of users;
receive user input to access the second document from a third user;
responsive to receiving user input to access the second document, determine a plurality or subgroup of the third user attempting to access the second document;
responsive to determining that the third user is in a first subgroup, providing access to the second document and the second data item field, the second data item field including a third data item;
responsive to determining that the third user is in a second subgroup, providing access to the second document and the second data item field, the second data item field including a fourth data item different from the third data item; and
responsive to determining that the third user is not in the first subgroup or the second subgroup but is in the group of users, providing access to the second document and the second data item field, the second data item field including a fifth data item different from the third and fourth data items.

5. The apparatus of claim 4, wherein the second document is transmitted after data identifying a disclosure of one of the first data item and the second data item is received.

6. The apparatus of claim 1, wherein the data item provided is unique to the plurality of users associated with the user accessing the first document.

7. The apparatus of claim 1, wherein the first plurality of users is approximately one half of the group of users and the second plurality of users is approximately another half of the group of users.

8. The apparatus of claim 1, the non-transitory memory further including instructions that, when executed, cause the apparatus to:
assign, by a data item assignment device, the first data item to users in the first plurality of users and the second data item to users in the second plurality of users.

9. The apparatus of claim 1, the non-transitory memory further including instructions that, when executed, cause the apparatus to:
determine whether the data item field of the first document will include the first data item or the second data item in response to one of: the user of the first plurality of users and the user of the second plurality of users accessing the first document.

10. A method, comprising:
transmitting to a group of users, by a computing device of an unauthorized disclosure identification system, a first document including a data item field, the group of users including a first portion of users including a first plurality of users and a second portion of users including a second plurality of users different from the first plurality of users;
receiving, by the computing device of the system and from a first user of the group of users, first user input accessing the first document;
providing, by the computing device of the system and to the first user of the group of users, access to the first document and the data item field, the data item field including a first data item, wherein the first data item is a first numerical item that is visible in the first document;
receiving, by the computing device of the system and from a second user of the group of users, second user input accessing the first document;
providing, by the computing device of the system and to the second user of the group of users, access to the first document and the data item field, the data item field including a second data item different from the first data item, wherein the second data item is a second numerical item that is visible in the first document,
wherein alternating users accessing the first document and the data item field access data items in the data item field alternating between the first data item and the second data item, and
wherein users accessing the first document with the first data item in the data item field form the first plurality of users forming the first portion of the group of users and users accessing the first document with the second data item in the data item field form the second plurality of users forming the second portion of the group of users;
receiving, by the computing device of the system, data identifying a disclosure, the disclosure including one of the first data item and the second data item;
responsive to receiving data identifying disclosure of the first data item, identifying, by the computing device of the system, users of the first plurality of users as a potential source of the disclosure; and
responsive to receiving data identifying disclosure of the second data item, identifying, by the computing device of the system, the users of the second plurality of users as a potential source of the disclosure.

11. The method of claim 10, wherein the first portion and the second portion are an entirety of the group of users.

12. The method of claim 10, further including:
after receiving the data identifying the disclosure and responsive to receiving data identifying disclosure of the first data item, sorting, by the system, the first plurality of users into at least two subgroups; and
after receiving the data identifying the disclosure and responsive to receiving data identifying disclosure of the second data item, sorting, by the system, the second plurality of users into at least two subgroups.

13. The method of claim 12, further including:
transmitting, by the computing device of the system, a second document having a second data item field to the group of users;
receiving, by the computing device of the system, user input to access the second document from a third user;
responsive to receiving user input to access the second document, determining, by the computing device of the system, a plurality or subgroup of the third user attempting to access the second document;
responsive to determining that the third user is in a first subgroup, providing, by the system, access to the second document and the second data item field, the second data item field including a third data item;
responsive to determining that the third user is in a second subgroup, providing, by the system, access to the second document and the second data item field, the second data item field including a fourth data item different from the third data item; and
responsive to determining that the third user is not in the first subgroup or the second subgroup but is in the group of users, providing, by the system, access to the second document and the second data item field, the second data item field including a fifth data item different from the third and fourth data items.

14. The method of claim 10, wherein the data item provided is unique to the plurality associated with the user accessing the first document.

15. The method of claim 10, wherein the first plurality of users is approximately one half of the group of users and the second plurality of users is approximately another half of the group of users.

16. One or more non-transitory computer-readable media having computer-executable instructions stored thereon that, when executed, cause at least one computing device to:
transmit to a group of users, a first document including a data item field, the group of users including a first portion of users including a first plurality of users and a second portion of users including a second plurality of users different from the first plurality of users;
receive, from a first user of the group of users, first user input accessing the first document;
provide to the first user of the group of users, access to the first document and the data item field, the data item field including a first data item, wherein the first data item is a first numerical item that is visible in the first document;
receive, from a second user of the group of users, second user input accessing the first document;
provide to the second user of the group of users, access to the first document and the data item field, the data item field including a second data item different from the first data item, wherein the second data item is a second numerical item that is visible in the first document,
wherein alternating users accessing the first document and the data item field access data items in the data item field alternating between the first data item and the second data item, and
wherein users accessing the first document with the first data item in the data item field form the first plurality of users forming the first portion of the group of users and users accessing the first document with the second data item in the data item field form the second plurality of users forming the second portion of the group of users;
receive data identifying a disclosure, the disclosure including one of the first data item and the second data item;
responsive to receiving data identifying disclosure of the first data item, identifying users of the first plurality of users as a potential source of the disclosure; and
responsive to receiving data identifying disclosure of the second data item, identifying the users of the plurality group of users as a potential source of the disclosure.

17. The one or more non-transitory computer-readable media of claim 16, wherein the first portion and the second portion are an entirety of the group of users.

18. The one or more non-transitory computer-readable media of claim 16, further including instructions that, when executed, cause the at least one computing device to:
after receiving the data identifying the disclosure and responsive to receiving data identifying disclosure of the first data item, sort the first plurality of users into at least two subgroups; and
after receiving the data identifying the disclosure and responsive to receiving data identifying disclosure of the second data item, sort the second plurality of users into at least two subgroups.

19. The one or more non-transitory computer-readable media of claim 18, further including instructions that, when executed, cause the at least one computing device to:
transmit a second document having a second data item field to the group of users;
receive user input to access the second document from a third user;
responsive to receiving user input to access the second document, determine a plurality or subgroup of the third user attempting to access the second document;
responsive to determining that the third user is in a first subgroup, providing access to the second document and the second data item field, the second data item field including a third data item;
responsive to determining that the third user is in a second subgroup, providing access to the second document and the second data item field, the second data item field including a fourth data item different from the third data item; and
responsive to determining that the third user is not in the first subgroup or the second subgroup but is in the group of users, providing access to the second document and the second data item field, the second data item field including a fifth data item different from the third and fourth data items.

20. The one or more non-transitory computer-readable media of claim 16, wherein the data item provided is unique to the plurality associated with the user accessing the first document.

* * * * *